(12) United States Patent
Ueda

(10) Patent No.: US 6,622,180 B2
(45) Date of Patent: *Sep. 16, 2003

(54) INFORMATION PROCESSING APPARATUS AND OUTPUT APPARATUS

(75) Inventor: Shigeru Ueda, Wako (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,927

(22) Filed: Jul. 12, 1999

(65) Prior Publication Data

US 2003/0110324 A1 Jun. 12, 2003

Related U.S. Application Data

(62) Division of application No. 08/939,680, filed on Sep. 29, 1997, now Pat. No. 5,964,851, which is a continuation of application No. 08/073,042, filed on Jun. 8, 1993, now abandoned.

(30) Foreign Application Priority Data

Jun. 11, 1992 (JP) ............................................. 4-151974

(51) Int. Cl.[7] ................................................ G06F 3/00

(52) U.S. Cl. ............................ 710/16; 710/33; 710/52; 712/245; 711/100

(58) Field of Search ............................ 710/1, 4, 13, 15, 710/16, 19, 107, 17, 33, 52, 61, 128; 709/220, 225, 201; 711/148, 169, 100, 156; 712/14, 225, 248

(56) References Cited

U.S. PATENT DOCUMENTS

| 4,898,059 | A | * | 2/1990 | Iizuka .......................... 84/601 |
| 5,108,207 | A | * | 4/1992 | Isobe et al. .................... 400/70 |
| 5,159,681 | A | * | 10/1992 | Beck et al. .................. 395/425 |
| 5,339,400 | A | * | 8/1994 | Iijima .......................... 395/425 |
| 5,488,708 | A | * | 1/1996 | Hayashi ....................... 711/115 |
| 5,696,984 | A | * | 12/1997 | Nagata et al. .............. 395/800 |
| 5,703,696 | A | | 12/1997 | Sakai et al. ................. 358/404 |
| 5,754,778 | A | * | 5/1998 | Shoujima .................... 709/206 |
| 5,964,851 | A | * | 10/1999 | Ueda ........................... 710/17 |

FOREIGN PATENT DOCUMENTS

| JP | 3-149615 | 6/1991 |
| JP | 4-096820 | 3/1992 |

* cited by examiner

Primary Examiner—Jeffrey Gaffin
Assistant Examiner—Rijue Mai
(74) Attorney, Agent, or Firm—Fitzpatrick, Cella, Harper & Scinto

(57) ABSTRACT

There is provided an information processing apparatus having a setting unit for setting an instruction for an inquiry of the capacity of a memory on a data destination side, and a transfer unit for transferring the instruction set by the setting unit to an external apparatus. There is also provided an output apparatus having a memory for storing data received from an external apparatus, and an output unit responsive to a reception of an instruction of an inquiry of the capacity of the memory from the external apparatus, for outputting information of the capacity of the memory to the external apparatus. There is also provided an output apparatus having a plurality of motors driven for an output process or a storage process, and an inhibit unit for inhibiting, when at least one of plurality of motors is driven, the other motors to be driven.

23 Claims, 16 Drawing Sheets

| 201 | 202 | 203 | 204 |
|---|---|---|---|
| RAM CAPACITY | AVAILABLE AMOUNT OF RAM STORAGE AREA | PROM CAPACITY | AVAILABLE AMOUNT OF PROM STORAGE AREA |

FIG. 3

| 301 | 302 | 303 | 304 | 305 | 306 | 307 | 308 |
|---|---|---|---|---|---|---|---|
| CODE A (RAM CAPACITY) | No. OF BYTES | CODE B (AVAILABLE AMOUNT OF RAM STORAGE AREA) | No. OF BYTES | CODE C (PROM CAPACITY) | No. OF BYTES | CODE D (AVAILABLE AMOUNT OF PROM STORAGE AREA) | No. OF BYTES |

FIG. 4

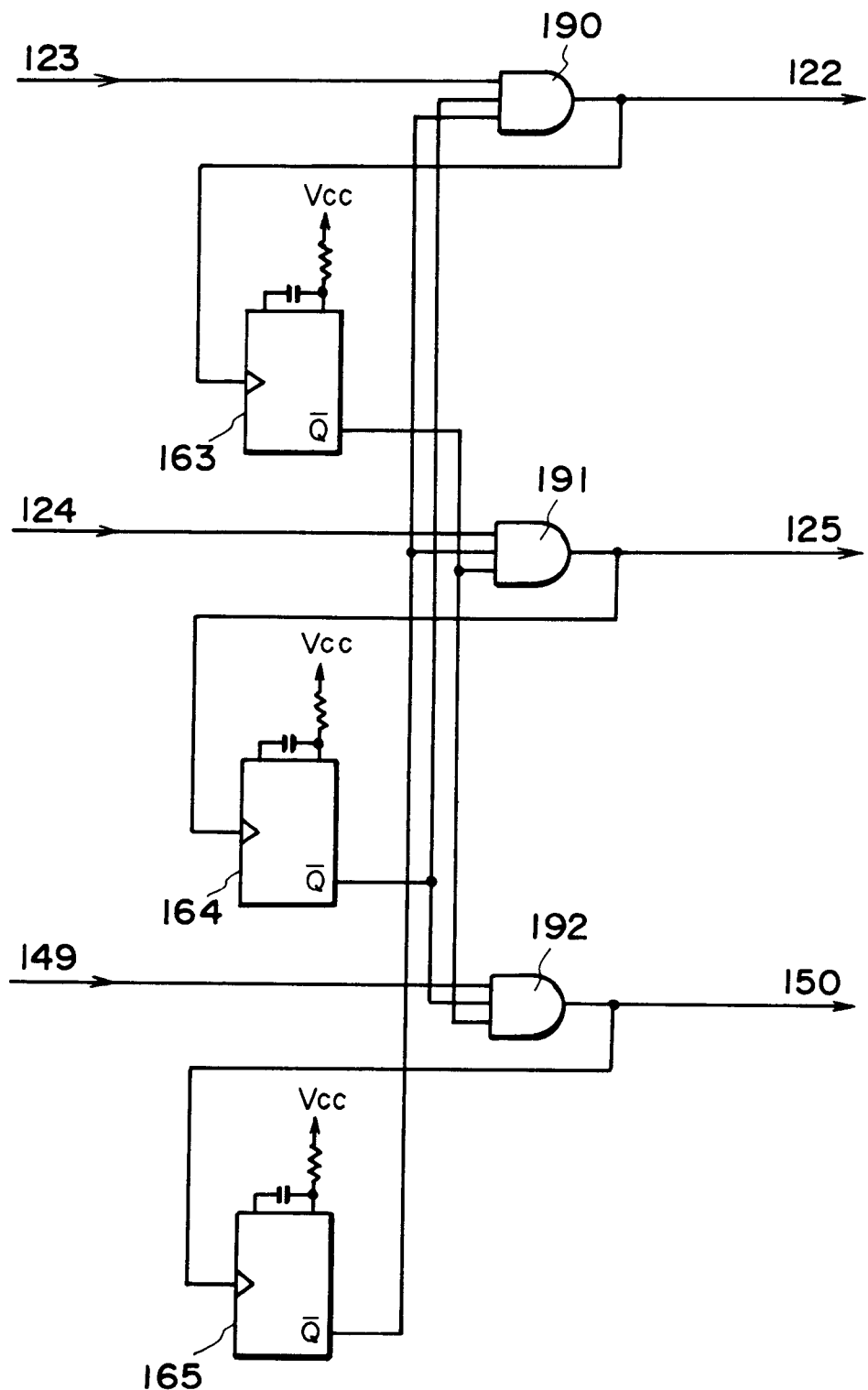
F I G. 16

INFORMATION PROCESSING APPARATUS AND OUTPUT APPARATUS

This application is a division of Application Ser. No. 08/939,680, filed on Sep. 29, 1997, now U.S. Pat. No. 5,964,851, issued Oct. 12, 1999, which is a continuation of Application Ser. No. 08/073,042, filed on Jun. 8, 1993, now abandoned.

BACKGROUND OF THE INVENTION

1. Field of the Invention

The present invention relates to an information processing apparatus for transferring data to an external apparatus, and an output apparatus for outputting information of the data supplied from an external apparatus.

2. Related Background Art

Print data such as character patterns and image data is supplied from an external apparatus such as a host computer to a printer to print it. With a conventional printer, the host computer cannot know the type and capacity of a memory of the printer in which the transmitted print data is stored. Specifically, in a conventional printer of the type that a character pattern once down-loaded from a host computer is used when a character code is received thereafter, there occurs the problem that the host computer cannot know at all the type and capacity of a memory such as a non-volatile memory and an ordinary volatile memory.

The host computer therefore cannot know how much character patterns can be transmitted to the printer and what available capacity an alterable non-volatile memory still has. As a result, there may occur a case wherein a character pattern cannot be printed after it was transmitted and a print instruction was executed, or the host computer is informed that a transmitted character pattern is not being stored in the printer, only after an error message is returned. Under such conditions, the host computer is required to transmit same character patterns each time a print is executed, or alternatively a non-volatile memory of unnecessarily large capacity is required to be provided in the printer.

Along with the above, motors of a printer and a hard disk drive have been activated independently and randomly. It is therefore necessary for a motor power source to have a current capacity allowing to activate all motors at the same time.

For example, the drive current and time of a general motor has a relationship as shown in FIG. 14 wherein I1 is a drive current required at the initial stage of motor activation, and I2 is a drive current required at the steady stage of motor operation which is generally half the current I1. It is therefore necessary to use a power source with a current capacity of I1×2 for allowing a drive motor for a printer photosensitive drum and a hard disk drive motor at the same time. This current capacity becomes large as the number of motors increases, such as 3×I1 for three motors.

SUMMARY OF THE INVENTION

Under the above circumstances, it is therefore an object of the present invention to provide an information processing apparatus capable of inquiring the capacity of a memory in which transmitted data is stored, and an output apparatus capable of outputting information representing the memory capacity in response to the memory capacity inquiry from an external apparatus.

In order to solve such problems, the present invention provides an information processing apparatus comprising: setting means for setting an instruction for an inquiry of the capacity of a memory means on a data destination side; and transferring means for transferring the instruction set by the setting means to an external apparatus.

In order to solve such problems, the present invention provides an output apparatus comprising: memory means for storing data received from an external apparatus; and output means responsive to a reception of an instruction of an inquiry of the capacity of the memory means from the external apparatus, for outputting information of the capacity of the memory means to the external apparatus.

Under the above circumstances, it is therefore an object of the present invention to provide an information processing apparatus capable of designating one of a plurality of memories on the data destination side and storing data in the designated memory, and an output apparatus for storing received data in the designated memory in accordance with the received memory designating information from an external apparatus.

In order to solve such problems, the present invention provides an information processing apparatus comprising: generating means for generating an instruction of designating one of a plurality of memory means on a data destination side; and transferring means for transferring the instruction generated by the generating means to an external apparatus.

In order to solve such problems, the present invention provides an output apparatus comprising: a plurality of memory means for storing data received from an external apparatus; and controlling means responsive to the reception of an instruction of designating one of the plurality of memory means and the data sent from the external apparatus, for storing the data in the designated memory means in accordance with the instruction.

It is an object of the present invention to provide an output apparatus capable of reducing the current consumed at the same time and hence the capacity of the power source, by inhibiting a plurality of motors being driven at the same time.

In order to solve such problems, the present invention provides an output apparatus comprising: a plurality of motors driven for an output process or a storage process; and inhibiting means for inhibiting, when at least one of the plurality of motors is driven, the other motors to be driven.

BRIEF DESCRIPTION OF THE DRAWINGS

FIG. 3 shows the format of a command to be issued from a host computer for the inquiry of memory information.

FIG. 4 shows the format of a response message returned from the printer to the host computer.

FIG. 16 is a circuit diagram of the motor controller of the printer shown in FIG. 15.

DETAILED DESCRIPTION OF THE PREFERRED EMBODIMENTS

Preferred embodiments of the present invention will be described with reference to the accompanying drawings.

Figure 1:
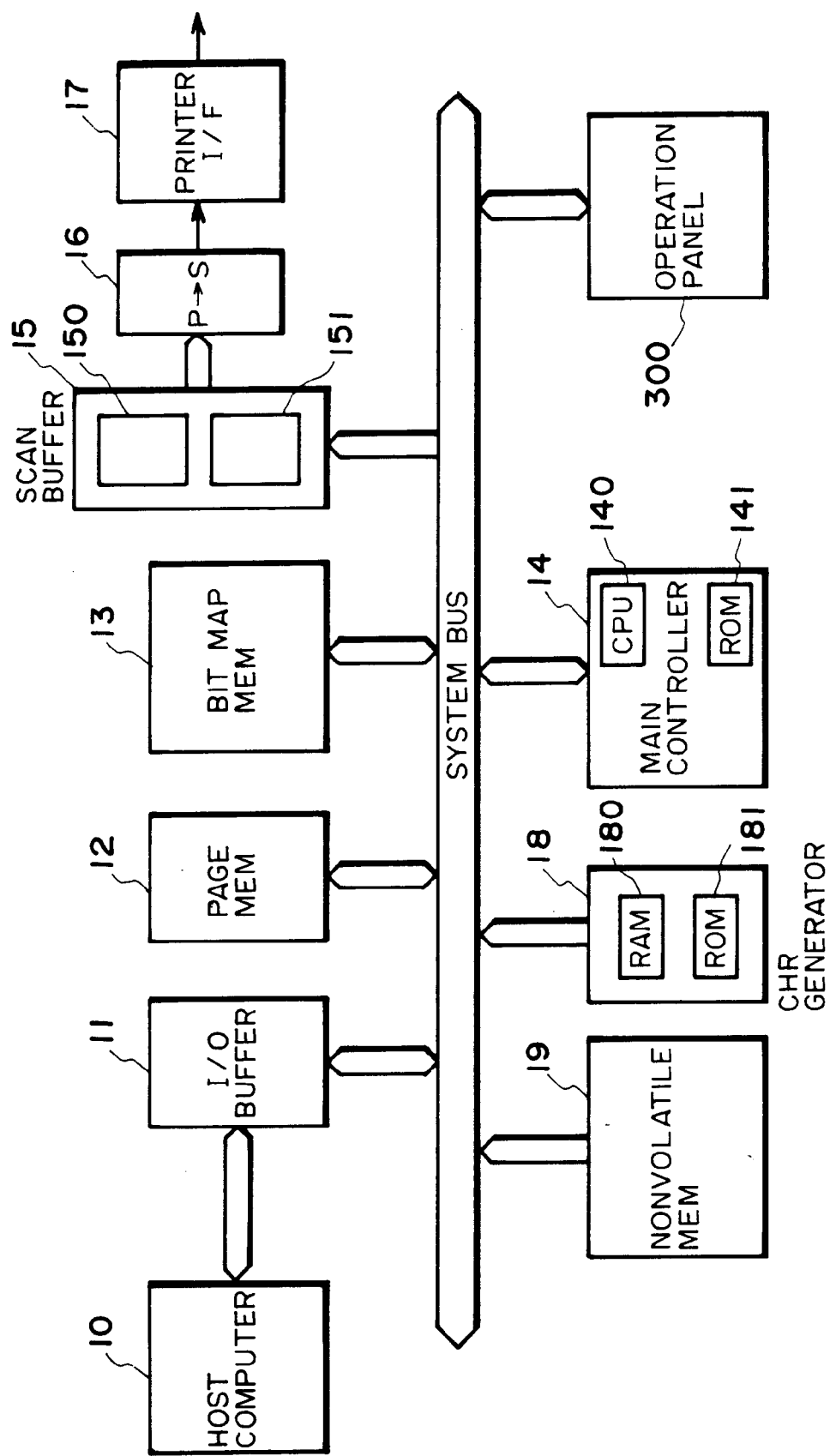
FIG. 1 is a block diagram showing the outline of the structure of a printer according to a first embodiment of the present invention.
Figure 2:
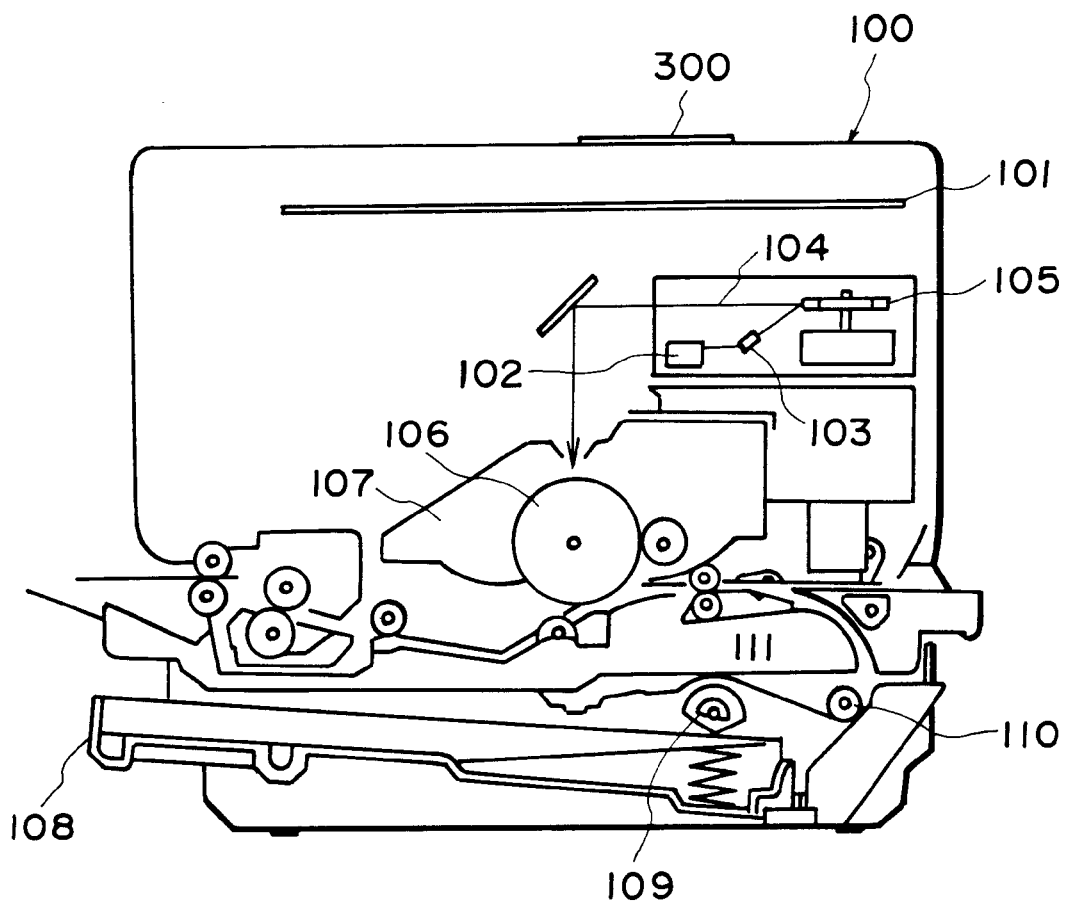
FIG. 2 is a cross sectional view showing the structure of the printer of the first embodiment.

FIG. 1 is a block diagram showing the outline of the structure of a control unit of a laser beam printer according to an embodiment of this invention. FIG. 2 is a cross sectional view showing the structure of the laser beam printer shown in FIG. 1. Although a laser beam printer is used in this embodiment, other printers such as an ink jet printer shown in FIGS. 20 and 21 may also be used.

FIG. 2 is a cross sectional view showing the structure of a laser beam printer (LBP) 100 shown in FIG. 1. LBP 100 is structured so that an external apparatus such as a host computer 10 can load in LBP 100 character pattern data, form data, and the like.

Referring to FIG. 2, reference numeral 100 generally represents the laser beam printer. LBP 100 stores character pattern data, form data, macro instructions, and the like externally supplied from the host computer 10 or the like, and supplies such character patterns, form patterns, and the like to form corresponding images on a recording medium such as a recording sheet. Reference numeral 300 represents an operation panel on which various switches and LED displays are mounted. Reference numeral 101 represents a printer control unit which controls the whole part of LBP 100 and analyzes character codes or the like entered from the host computer. The printer control unit 101 converts a character code into a video signal of the corresponding character pattern, and outputs the video signal to a laser driver 102.

The laser driver 102 is a circuit for driving a semiconductor laser 103 by turning it on and off in accordance with an inputted video signal. A laser beam 104 is moved in the right or left direction by a rotary polygon mirror 105 to scan an electrostatic drum 106, so that an electrostatic latent image of a character pattern is formed on the drum 106. This latent image is developed by a developing unit 107 disposed around the drum 106, and transferred onto a recording cut-sheet paper. Recording sheets are accommodated within a paper cassette mounted on LBP 100, and fed within LBP 100 by means of paper supply rollers 109 and paper feed rollers 110 and 111 to sequentially load them on the electrostatic drum 106.

The structure of the printer control unit 101 will be described with reference to FIG. 1.

Reference numeral 11 represents an input/output buffer having an input device such as a pointing device not shown, and transferring data to and from the host computer 10. Reference numeral 12 represents a page memory for storing document data sent from the host computer 10 in unit of page. Reference numeral 13 represents a bit map memory which stores dot image data corresponding to code data loaded in the page memory 12 while referring to a character generator 18 or non-volatile memory 19. Reference numeral 14 represents a main controller whose CPU 140 controls the printer control unit 101 in accordance with programs (shown by the flow charts of FIGS. 5 and 9) stored in ROM 141 by using the working area of a RAM not shown. Reference numeral 15 represents a scan buffer for storing dot data in unit of scan line, the dot data being sent to a printing mechanism shown in FIG. 2. While data is being written in one buffer (e.g., 150), data is being read from the other buffer (e.g., 151) and outputted to the printing unit. The scan buffer 15 operates as a so-called double buffer.

Reference numeral 16 represents a P/S converter for converting parallel data into serial data. Reference numeral 17 represents a printer I/F unit for outputting serial dot data to the laser driver 102 shown in FIG. 2. Reference numeral 18 represents a character generator which is constituted by a RAM 180 and a ROM 181 storing predetermined character patterns or the like. Reference numeral 19 represents a non-volatile memory such as an erasable flash PROM and EEPROM.

The operation of the printer 100 constructed as above will be described next.

Of character patterns to be printed by the printer 100, the host computer 10 first sends via a data line character patterns of character codes not stored in the character generator 18 or non-volatile memory 19.

Prior to sending character patterns, the host computer 10 sends a command to the printer 100 to check the memory capacity of the printer 100.

FIG. 3 shows a format of a command to be sent from the host computer 10 to the printer 100 for checking the memory capacity. A command has specific codes not used by general document data to distinguish between the command and document codes.

Figure 17:
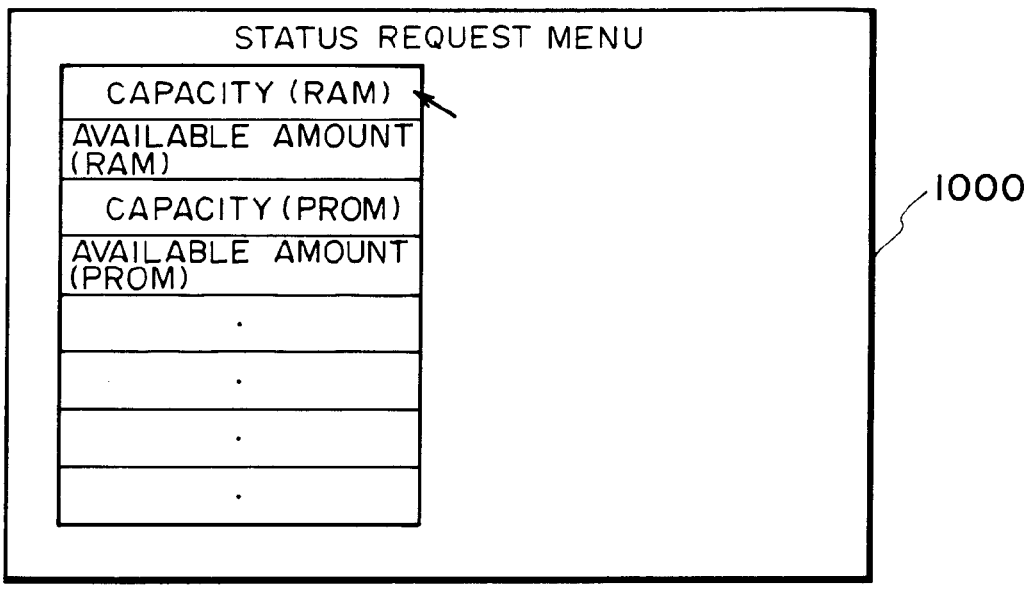
FIG. 17 shows a status request menu.

Referring to FIG. 3, reference numeral 201 represents a RAM capacity code used for checking the capacity of RAM 180 of the character generator 18 of the printer 100 which stores character patterns sent from the host computer 10. Reference numeral 202 represents an available RAM capacity code used for checking the available amount of RAM 180 storage area. Reference numeral 203 represents a PROM capacity code used for checking the capacity of the non-volatile memory (flash PROM) 19 which stores character patterns. Reference numeral 204 represents an available PROM capacity code used for checking the available amount of the non-volatile memory 19 storage area. A command shown in FIG. 3 can be generated by selecting icons on a status request menu 1000 such as shown in FIG. 17 displayed on an unrepresented display screen of the host computer 10, by using an unrepresented pointing device or the like. A CPU (not shown) of the host computer 10 outputs the command via a bi-directional data line to the printer 100.

Figure 18:
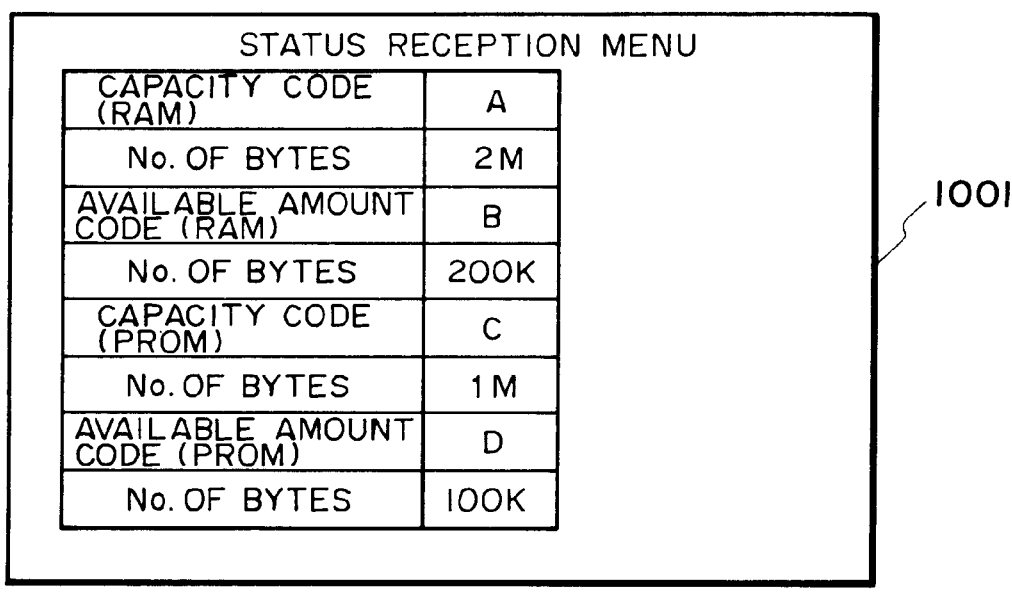
FIG. 18 shows a status reception menu.

In response to the received command, CPU 140 of the printer sends back status data shown in FIG. 4 to the host computer 10 via the bi-directional data line. A status reception menu such as shown in FIG. 18 is then displayed on the unrepresented display screen of the host computer 10.

Referring to FIG. 4, reference numeral 301 represents a RAM capacity code for indicating the capacity of RAM 180. Reference numeral 302 represents the number of bytes of the capacity of RAM 180, the capacity being represented by the number of bytes (e.g., 2 M bytes). The number of bytes is represented by eight bits, the minimum value corresponding to 10 K bytes. Reference numeral 303 represents an available RAM capacity code B for indicating the available amount of RAM 180 storage area. Reference numeral 304 represents the number of bytes (e.g., 200 K bytes) of the available RAM 180 storage area. Reference numeral 305 represents a PROM capacity code C for indicating the capacity of PROM 19. Reference numeral 306 represents the number of bytes (e.g., 200 K bytes) of the capacity of PROM 19. Reference numeral 307 represents an available PROM capacity code D for indicating the available amount of PROM 19 storage area. Reference numeral 308 represents the number of bytes (e.g., 100 K bytes) of the available PROM 19 storage area. The numbers of bytes are stored in a working area table of an unrepresented RAM of the main controller 14. In response to the input of the command shown in FIG. 3, the status data shown in FIG. 4 is generated.

Figure 5:
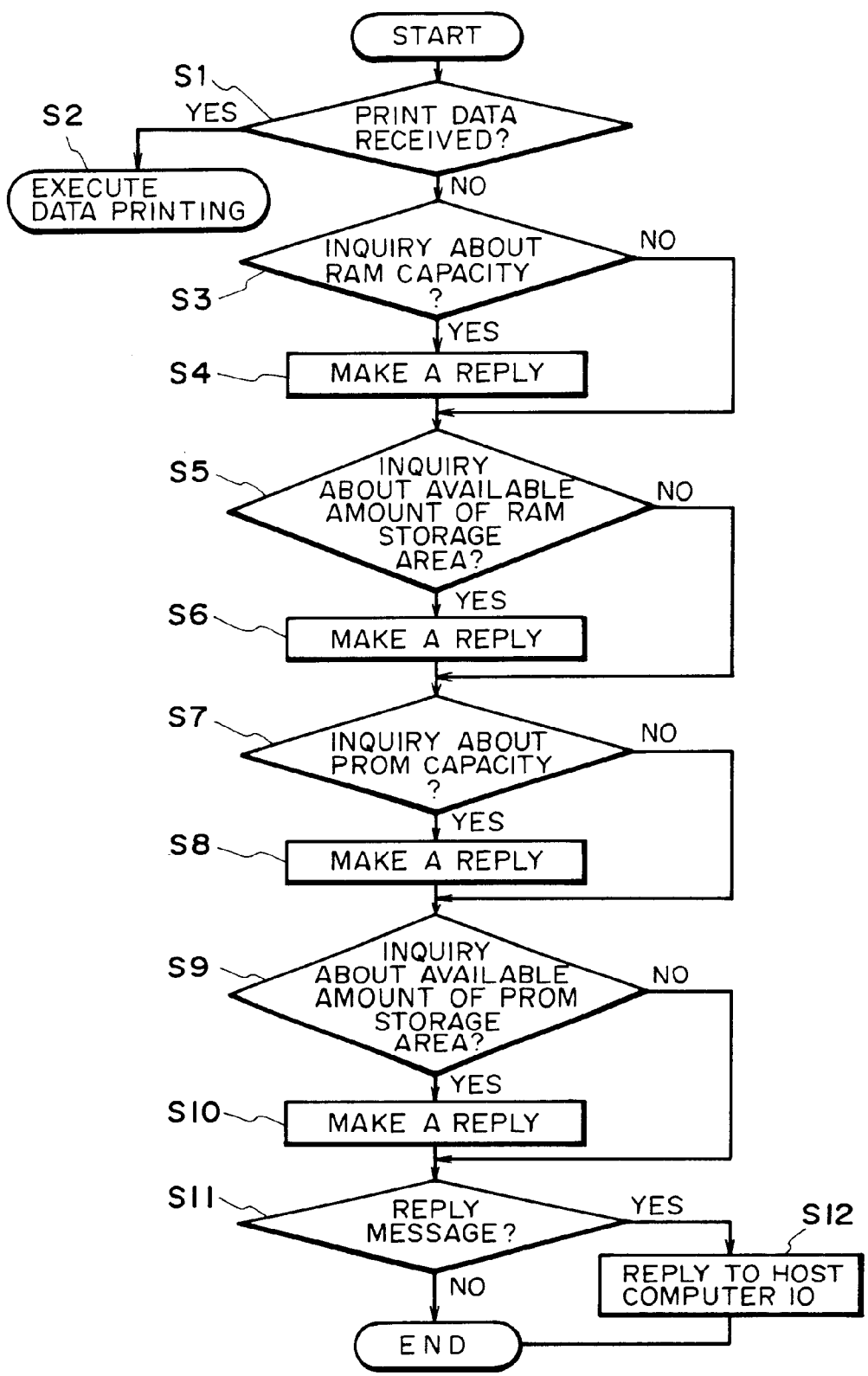
FIG. 5 is a flow chart explaining the operation of the printer of the first embodiment.

FIG. 5 is a flow chart illustrating the operation when the host computer 10 sends the command shown in FIG. 3 and the printer 100 returns back the status data shown in FIG. 4. This operation is executed by CPU 140 of the main controller 14 in accordance with control programs stored in ROM 141.

The operation starts when print data is received from the host computer 10. At step S1 it is checked whether received data is print data. If print data, it is stored in the page memory 12 at Step S2. After print data of one page has been stored in the page memory 12, the data in the page memory 12 is developed into bit map data and stored in the bit map memory 13 by referring to the character patterns stored in the character generator 18 or non-volatile memory 19. The bit map print data is outputted via the scan buffer 15 and P/S converter 16 to the printing unit to print the data on a recording sheet.

If received data is not print data at Step S1, it is checked at Step S3 whether the received data is an inquiry of the capacity of RAM 180 of the character generator 18. If so, at Step S4 a response message (refer to 301 and 302 of FIG. 4) for indicating the capacity of RAM 180 is generated while referring to the working area table in the unrepresented RAM of the main controller 14. Next, it is checked at Step S5 whether the received data is an inquiry of the available capacity of RAM 180 storage area. If so, at Step S6 a response message (refer to 303 and 304 of FIG. 4) for indicating the available capacity of RAM 180 storage area is generated while referring to the working area table. It is checked at Step S11 whether there is a response message. If a response message is present, it is supplied to the host computer 10. The data in the table is updated by CPU 140 which always monitors the available capacities of RAM 180 and PROM 19 storage areas. The total capacities of RAM 180 and PROM 19 are loaded in the table upon power-on of the printer.

Figure 19:
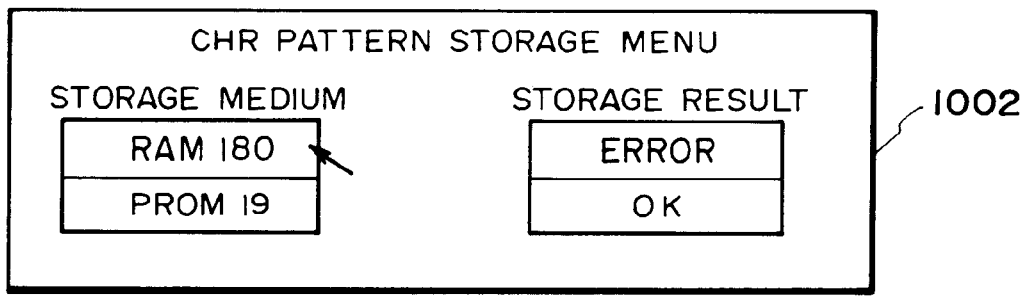
FIG. 19 shows a character pattern storage menu.

After the memory capacity of the printer 100 is checked, the host computer 10 sends character patterns to the printer 100. The character patterns are stored in RAM 180 of the character generator 18 or in the non-volatile memory 19, and referred to when a character code is developed into a pattern. If character patterns in excess of the memory capacity are sent to the printer 100, an error status indicating a memory-over is sent from the printer 100 to the host computer 10 via the data line interconnecting the printer 100 and host computer 10. In this embodiment, a character pattern storage menu 1002 such as shown in FIG. 19 is displayed on the unrepresented display screen of the host computer. An error status of the storage result is displayed and reported to the user.

Whether character patterns sent to the printer 100 from the host computer 10 under the control of the unrepresented CPU are to be stored in the non-volatile memory 19 or RAM 180, may be designated from the character pattern storage menu 1002 by using the pointing device or the like. With such an arrangement, it is possible to prevent an over-flow of character patterns unable to be stored in the memory of the printer 100. This will be described in detail in the second embodiment.

Figure 6:
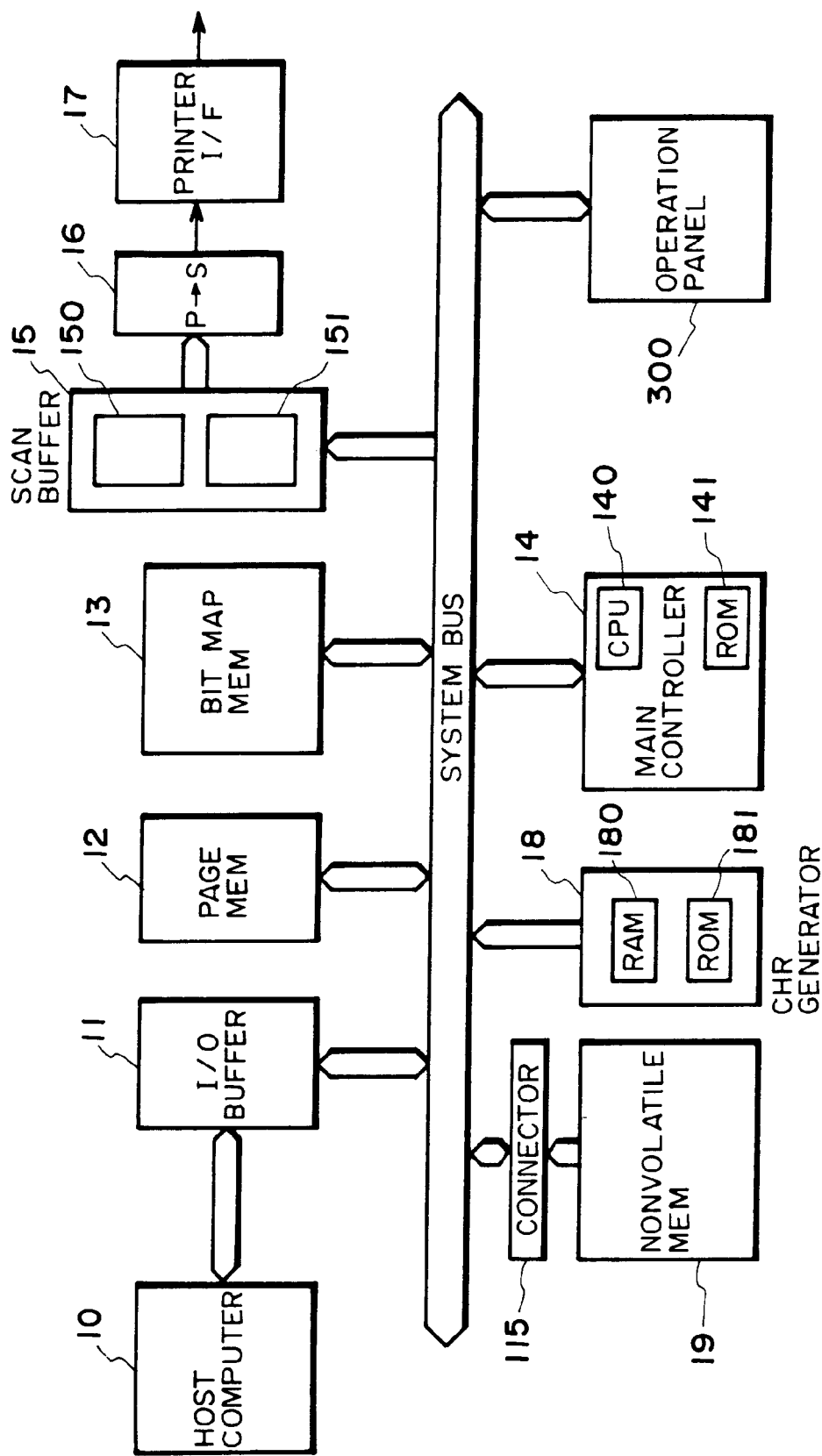
FIG. 6 is a block diagram showing the outline structure of the printer according to the second embodiment of the present invention.

FIG. 6 is a block diagram showing the outline of the structure of a printer according to the second embodiment of this invention. In FIG. 6, like elements to those shown in FIG. 1 are represented by using identical reference numerals, and the description therefor is omitted.

A non-volatile memory 19 may be mounted on or dismounted from the printer by using a connector 115. If a user does not require the non-volatile memory 19, i.e., if the user does not require to store character patterns, the printer without the non-volatile memory of low cost can be purchased.

A new non-volatile memory unit 19 storing desired character patterns may be replaced by an old non-volatile memory 19 so that desired character patterns can be printed instead of receiving them from the host computer 10.

The operation of the printer of the second embodiment will be described with reference to FIGS. 7 to 9. The structure of this printer is substantially the same as that of the first embodiment printer shown in FIGS. 1 and 2, and so the description of the structure is omitted.

In the second embodiment, prior to printing, character patterns not present in the character generator 18 and non-volatile memory 19 of the printer 100 are transmitted (down-loaded) from the host computer 10 and loaded in the printer.

Figure 7:
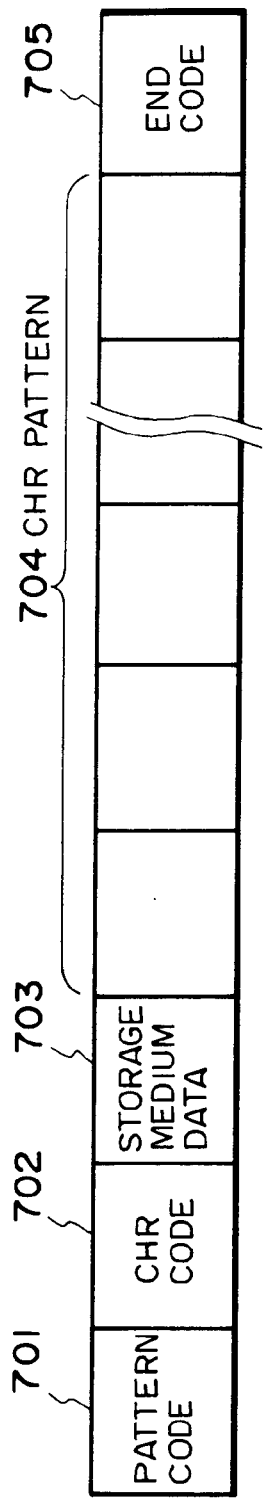
FIG. 7 shows an example of the format of a command to be sent from the host computer to the printer of the second embodiment.

FIG. 7 shows an example of a command to be sent from CPU of the host computer 10 to the printer 100 when down-loading character patterns.

In FIG. 7, reference numeral 701 represents a pattern code indicating that the following data is for a character pattern. Reference numeral 702 represents a character code, and reference numeral 703 represents storage medium data indicating whether the character pattern is to be stored in RAM 180 of the character generator 18 or in the non-volatile memory 19, the storage medium data being set using the character pattern storage menu 1002. Reference numeral 704 represents a character pattern corresponding to the character code 702. Reference numeral 705 represents an end code indicating the end of data.

Figure 8:
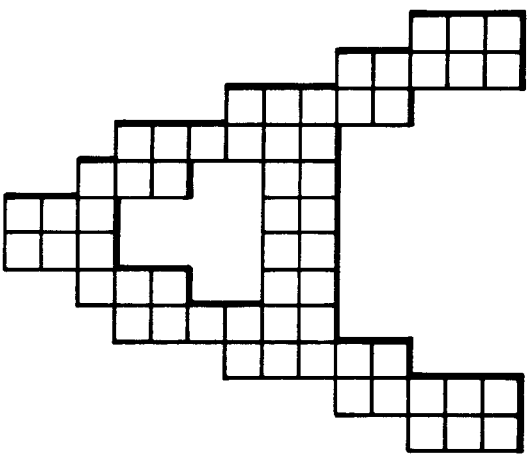
FIG. 8 shows an example of a character pattern sent from the host computer.
Figure 9:
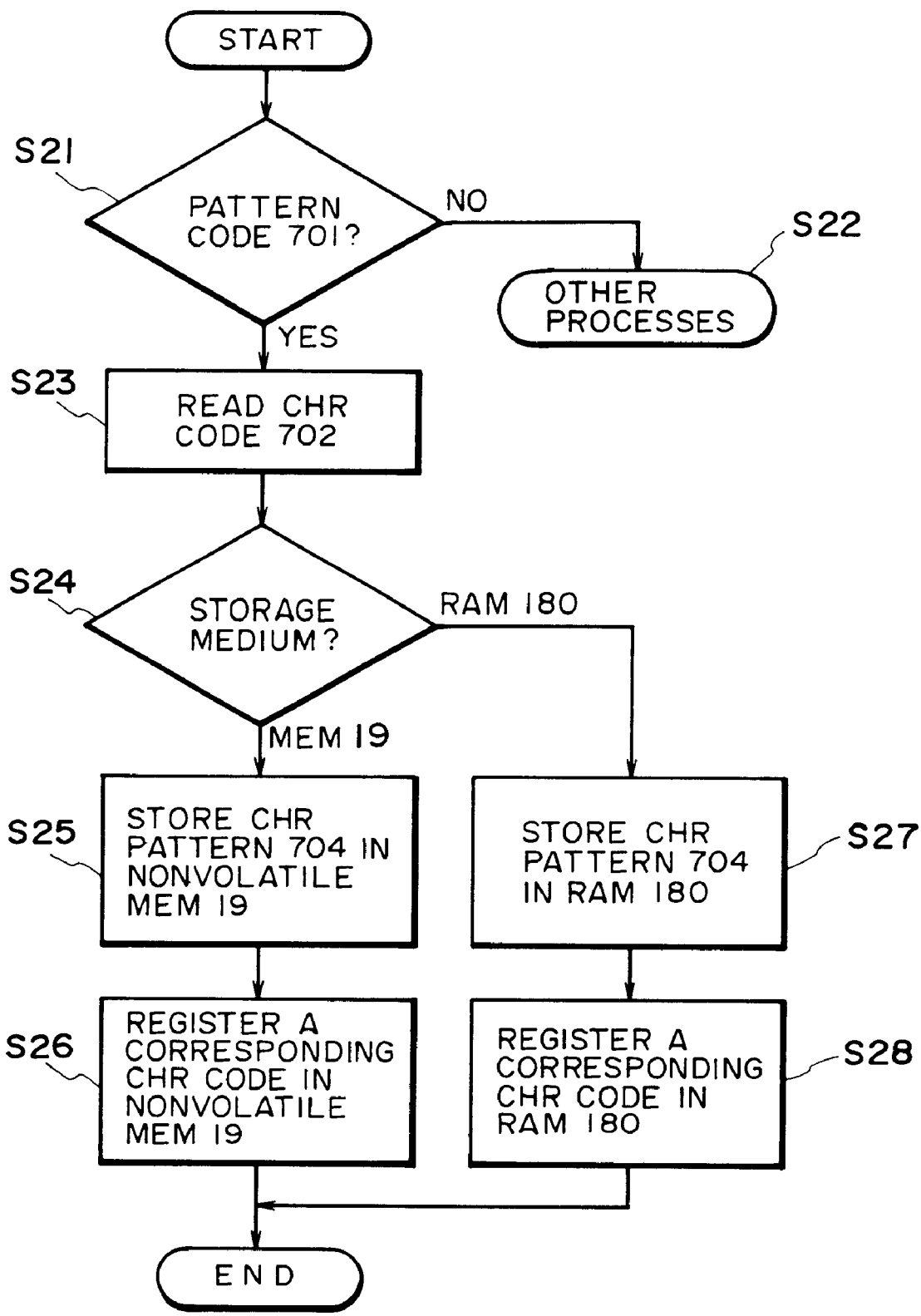
FIG. 9 is a flow chart explaining the operation of storing a character pattern by the printer of the second embodiment.

FIG. 8 shows an example of a character pattern to be transmitted from the host computer 10 to the printer.

Referring to the flow chart shown in FIG. 9, the operation of the printer 100 after receiving the command shown in FIG. 7 will be described.

The operation starts when data is received from the host computer. First, at Step S21 it is checked whether received data contains the pattern code 701. If not contained, the operation matching the received data is performed at Step S22. If the pattern code 701 is detected at Step S21, the character code 702 is read at step S23. Thereafter, the storage medium data 703 is read to identify the storage medium.

If the identified storage medium is the non-volatile memory 19, at Step S25 the character pattern 704 is stored in the non-volatile memory 19, and its character code along with the start address of the character pattern is stored in an unrepresented table of the non-volatile memory 19. If the identified storage medium is RAM 180, at Step S27 the character pattern 704 is stored in RAM 180, and its character code along with the start address of the character pattern is stored in an unrepresented table of RAM 180. When the host computer 10 issues a character code thereafter, the printer 100 checks whether the corresponding character pattern is being stored in RAM 180 of the character generator 18 or in the non-volatile memory 19. If it is being stored, the character pattern is read from RAM 180 or from the non-volatile memory 19 to develop it into a bit map character pattern.

Next, the third embodiment of the present invention will be described with reference to FIGS. 10 to 13.

Figure 10:
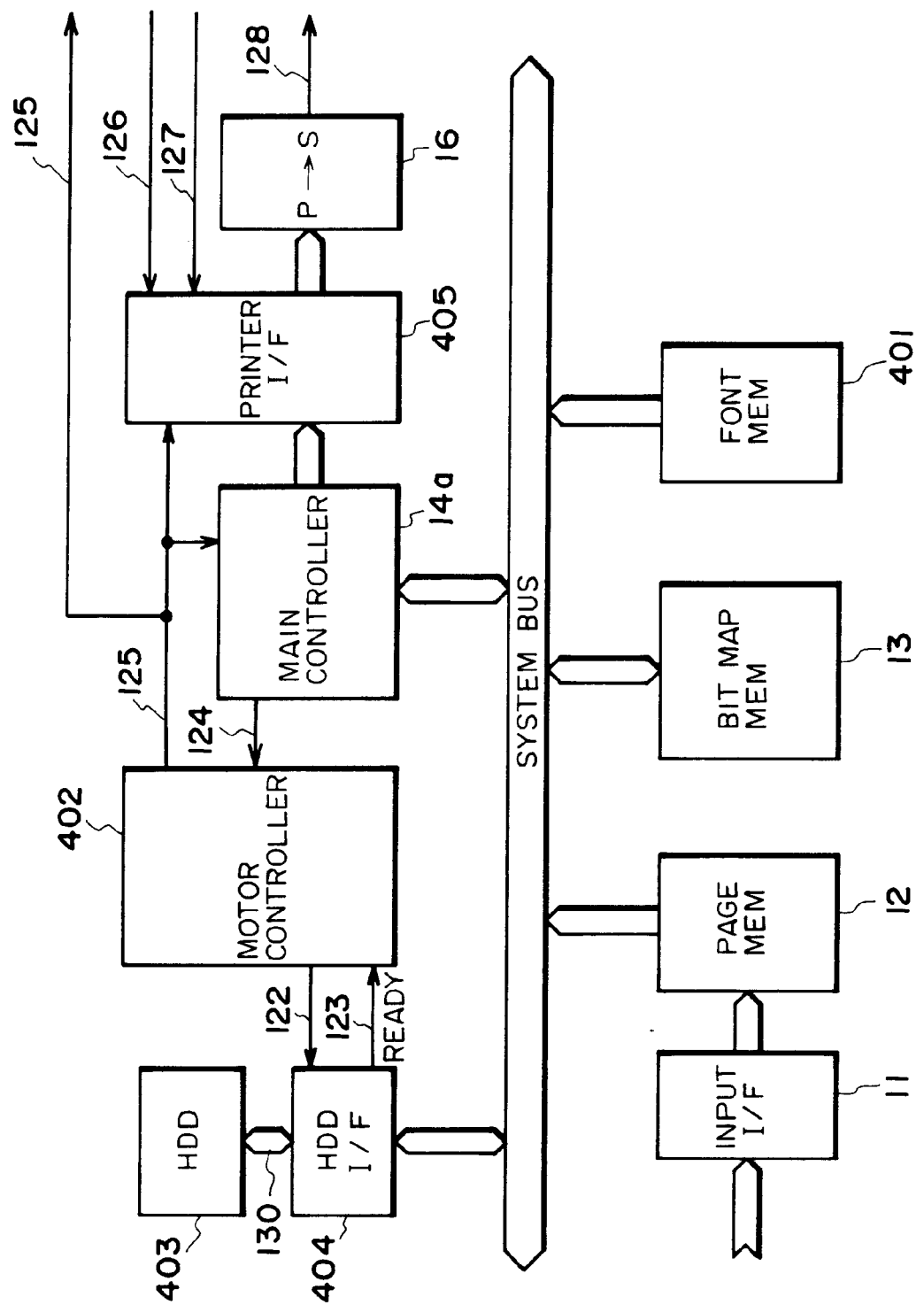
FIG. 10 is a block diagram showing the outline structure of the printer according to the third embodiment of the present invention.

FIG. 10 is a block diagram showing the outline structure of the printer according to the third embodiment. Like elements to those shown in FIG. 1 are represented by using identical reference numerals, and the description therefor is omitted.

Figure 11:
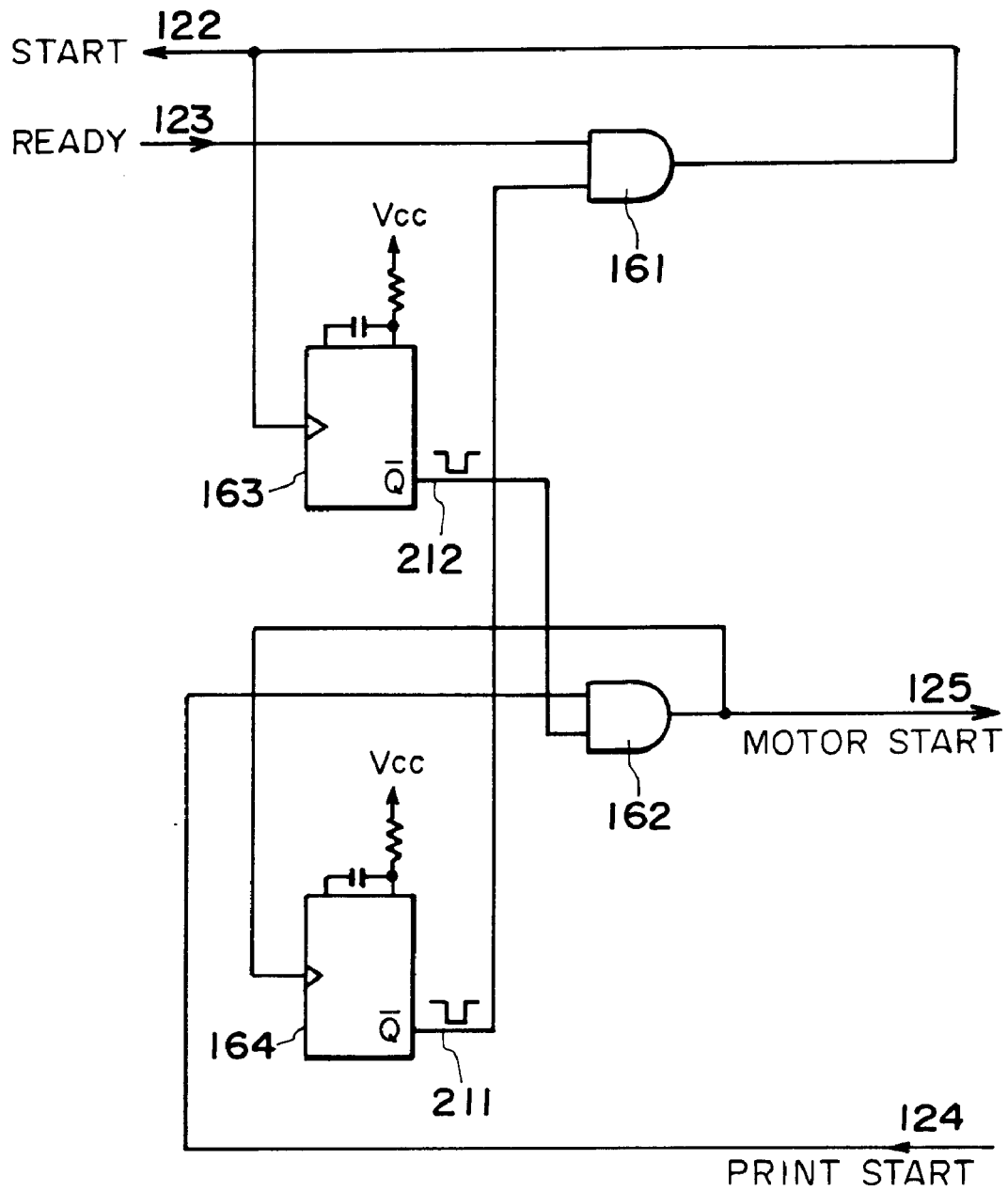
FIG. 11 is a circuit diagram of the motor controller of the printer of the third embodiment.

In FIG. 10, reference numeral 401 represents a font memory storing character patterns and the like. Reference numeral 402 represents a motor controller the detail of which is shown in FIG. 11 and the operation of which will be described later with reference to FIG. 11. Reference numeral 404 represents an interface (I/F) unit for controlling the operation of a hard disk 403. The hard disk 403 stores font data not stored in the font memory 401. A main controller 14a operates such that if font data is not being stored in the font memory 401, it is read from the hard disk 403 and developed in a bit map memory 13. The hard disk 403 may store the dot pattern developed in the bit map memory 13 as a standard pattern.

Figure 12:
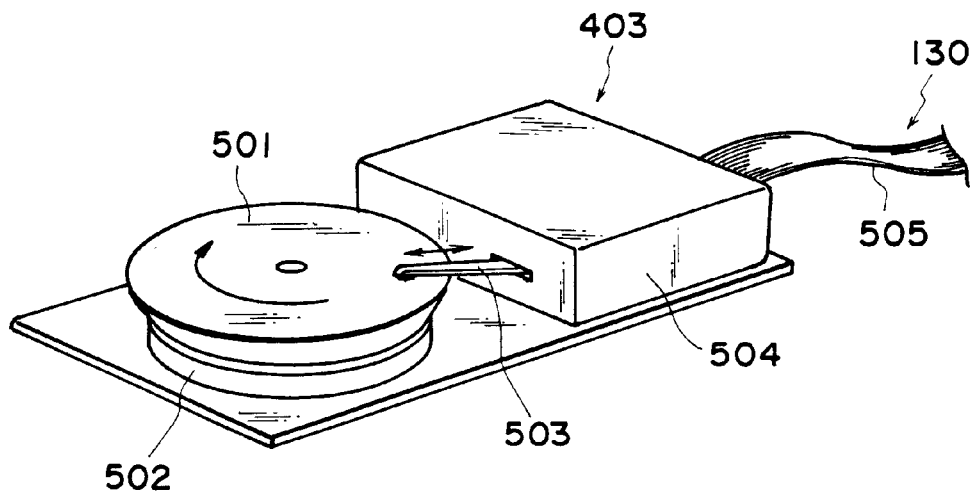
FIG. 12 shows the structure of the hard disk of the printer of the third embodiment.

FIG. 12 shows the structure of the hard disk 403.

In FIG. 12, reference numeral 501 represents a magnetic disk, reference numeral 502 represents a motor for rotating the magnetic disk, and reference numeral 503 represents a pickup for reading/writing data from/to the magnetic disk. Reference numeral 504 represents a controller for controlling the hard disk 403, and reference numeral 505 represents a connection cable to the hard disk interface unit 404.

The operation of the motor controller 402 will be described with reference to FIG. 11.

Reference numeral 123 represents a ready signal. When an access instruction to the hard disk 403 is supplied to the hard disk I/F unit 404 and if the hard disk 403 is not still activated, the hard disk I/F unit 404 outputs the ready signal changed from the low level to the high level. Upon this ready signal, an AND gate 161 is opened so that a start signal 122 is outputted to the hard disk I/F unit 404. When the start signal 122 is outputted, a multi-vibrator 163 is triggered to output a pulse signal 211 of low level during the period longer than the time duration while the drive current at the initial stage of activating the motor 502 of the hard disk 403 flows. Therefore, during this period, the AND gate 162 will not be opened even if the print start signal 124 is supplied from the main controller 14a, and so a motor start signal 125 for rotating a motor 171 (FIG. 13) of an electrostatic drum 106 of the printing unit will not be outputted to a print controller 405.

Similarly, when a print start signal 124 is supplied from the main controller 14a and the motor start signal 125 is outputted to the print controller 405, a mono-stable multivibrator 164 is triggered. As a result, an output signal 211 takes the low level while the motor 171 (FIG. 13) starts rotating to rotate the electrostatic drum 106 of the printing unit. During this period, the AND gate 161 is closed so that the motor of the hard disk will not be driven and an access to the hard disk 403 is inhibited.

In the above manner, an access to the hard disk 403 is inhibited while the motor 171 of the printing unit starts rotating, whereas the motor 171 of the printing unit will not be driven while the motor 502 of the hard disk starts rotating.

Figure 13:
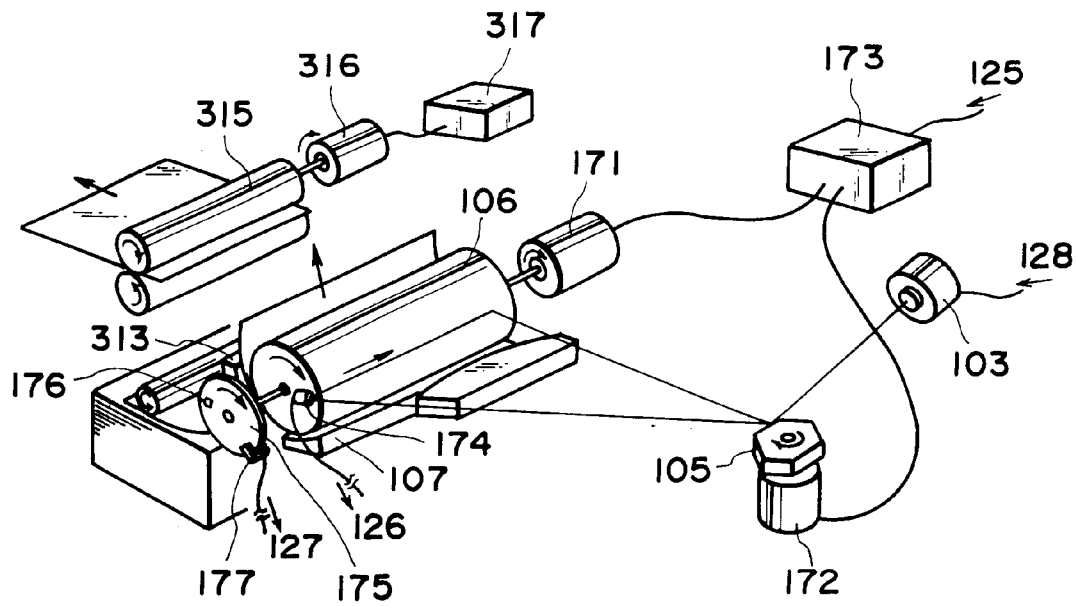
FIG. 13 shows the outline structure of the printing unit of the printer of the third embodiment.

FIG. 13 shows the outline structure of the printing unit. Like elements to those shown in FIG. 2 are represented by using identical reference numerals.

In FIG. 13, reference numeral 171 represents a main motor for rotating the electrostatic drum 106, reference numeral 171 represents a motor for rotating a polygon mirror 105, and reference numeral 173 represents a motor driver for driving these motors. Reference numeral 174 represents a beam detector for detecting near at the electrostatic drum 106 a laser beam reflected and scanned by the polygon mirror 105. This detection signal is outputted to the print interface unit 405 as a beam detect signal (horizontal sync signal) 126. Reference numeral 175 represents a rotary disk which rotates with the electrostatic drum 106 mounted on its rotary axis. When a slit 176 formed in the rotary disk 175 is detected by a photocoupler 177, this detection signal is outputted to the print interface unit 405 as the vertical sync signal. Reference numeral 316 represents a motor for rotating a fixing unit 315, and reference numeral 317 represents a motor driver for driving the motor 316. Reference numeral 313 represents a transfer unit, and reference numeral 315 represents the fixing unit.

The print interface unit 405 outputs print data to a parallel/serial converter 16 synchronously with the sync signals 126 and 127, and a serial signal 128 is supplied to the printing unit. This serial signal is supplied to the laser driver 102 to drive the semiconductor laser 103, to turn it on and off, and to print the image on a recording sheet by means of a known electrophotographing method.

Figure 14:
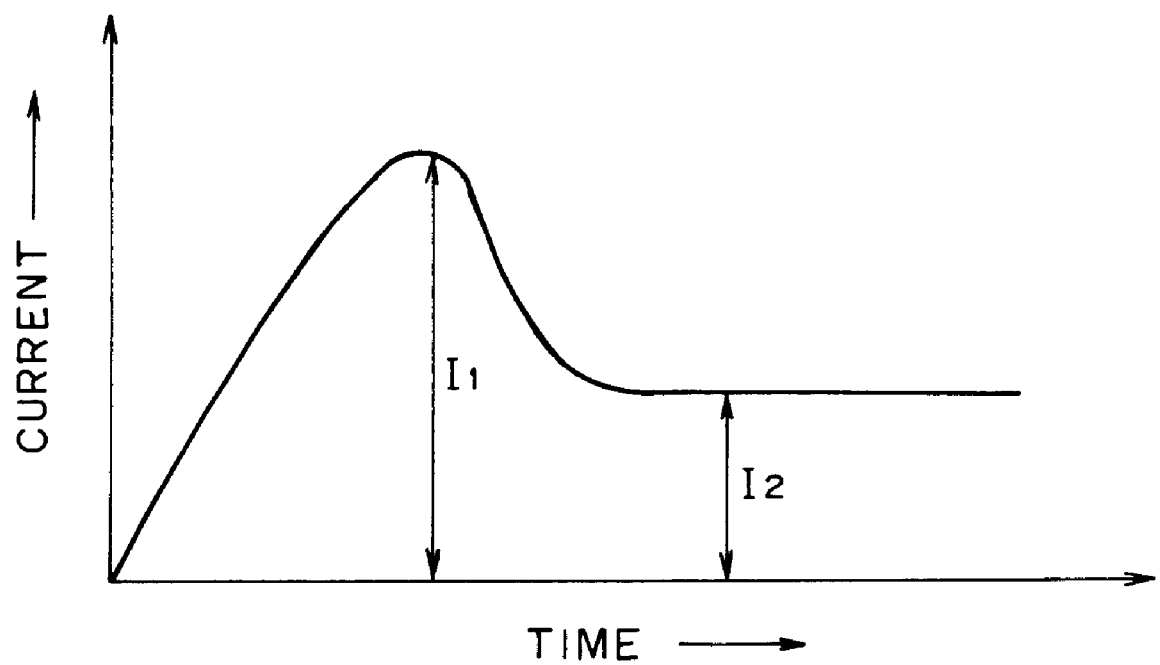
FIG. 14 is a graph showing the drive current of a general motor at the initial stage of actuation and at the steady state.

FIG. 14 shows the relationship between drive current and time of a general motor. At the initial stage of activating the motor, a large drive current I1 flows, and a small current I2 flows thereafter at the steady state of motor rotation. In the printer having the hard disk 403 shown in FIG. 10, if the motor 502 of the hard disk 403 and the main motor 171 of the printing unit are driven both at the same time, it becomes necessary to use a power source having a current capacity larger than two times the current I1 shown in FIG. 14.

In the printer with the hard disk 403 of the third embodiment, the motor 502 of the hard disk 403 and the main motor 171 of the printing unit are inhibited to be driven both at the same time, reducing the current capacity of the power source of the printer.

In the third embodiment, a hard disk has been illustratively used. The present invention is not limited to the hard disk, but other devices such as floppy disks may also be used.

Figure 15:
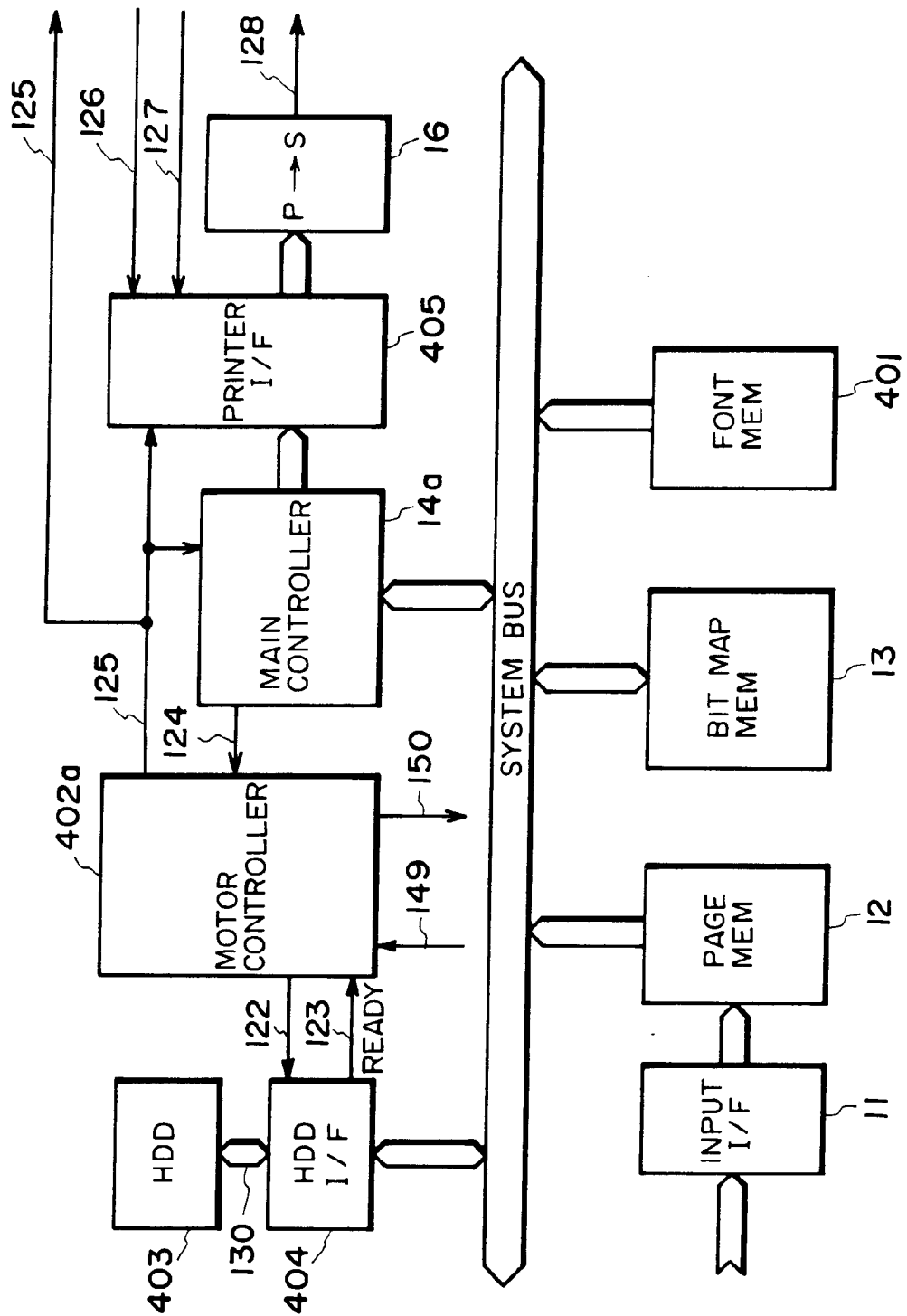
FIG. 15 is a block diagram showing the outline structure of a printer which is a modification of the third embodiment.

Not only the main motor of the printing unit in the embodiment, but also a start signal 149 and start enabled signal 150 for a motor 316 of the fixing unit may also be controlled in the similar manner. The structure of the motor controller 402 for the latter case is shown in FIG. 16, and the outline structure of the printer is shown in FIG. 15. In FIG. 16, reference numerals 190 to 192 represent AND gates, and reference numerals 163 to 165 represent mono-stable multi-vibrators. The operation of the motor controller 402a is fundamentally the same as that shown in FIG. 11, and so the description therefor is omitted.

In the above embodiments, a flash PROM is used as the non-volatile memory 19. Instead, it is obvious that an EEPROM manufactured by different processes or a hard disk may be used for example.

Furthermore, data transfer between the host computer and printer is performed via a data line in the above embodiments. Another signal line dedicated to a status signal indicating an over-flow may also be used additionally.

The present invention may be applied to a system having a plurality of apparatuses and to a system having a single apparatus. The present invention is also applicable to a system or apparatus itself by using programs of this invention.

As appreciated from the foregoing description of the embodiments, a host computer can know the memory capacity of a printer in advance. Accordingly, character patterns can be transmitted in various ways suitable for various operation conditions.

The host computer can transmit only necessary character patterns to the printer and designate whether the character patterns are to be stored in a RAM if they are allowed to be erased, ore in an erasable non-volatile memory if they are not allowed to be erased inadvertently. Accordingly, character patterns can be managed easily.

A plurality of motors of a printer are not driven at the same time, thereby allowing the capacity of the power source to be reduced.

As described so far, according to the present invention, character patterns and the like can be stored in advance.

It is possible to designate whether character patterns sent from an external apparatus is to be stored in a non-volatile memory or in a volatile memory.

For a printer having a plurality of motors, it is possible not to drive the motors at the same time, reducing the current consumed at the same time and hence the capacity of the power source.

The status request menu 1000, status reception menu 1001, and character pattern storage menu 1002 are controlled by an unrepresented CPU of the host computer 10.

In the above embodiments, the laser beam printer such as shown in FIG. 2 is used by way of example. It is, however, apparent from the following description that an ink jet printer such as shown in FIGS. 20 and 21 may also be used.

Figure 20:
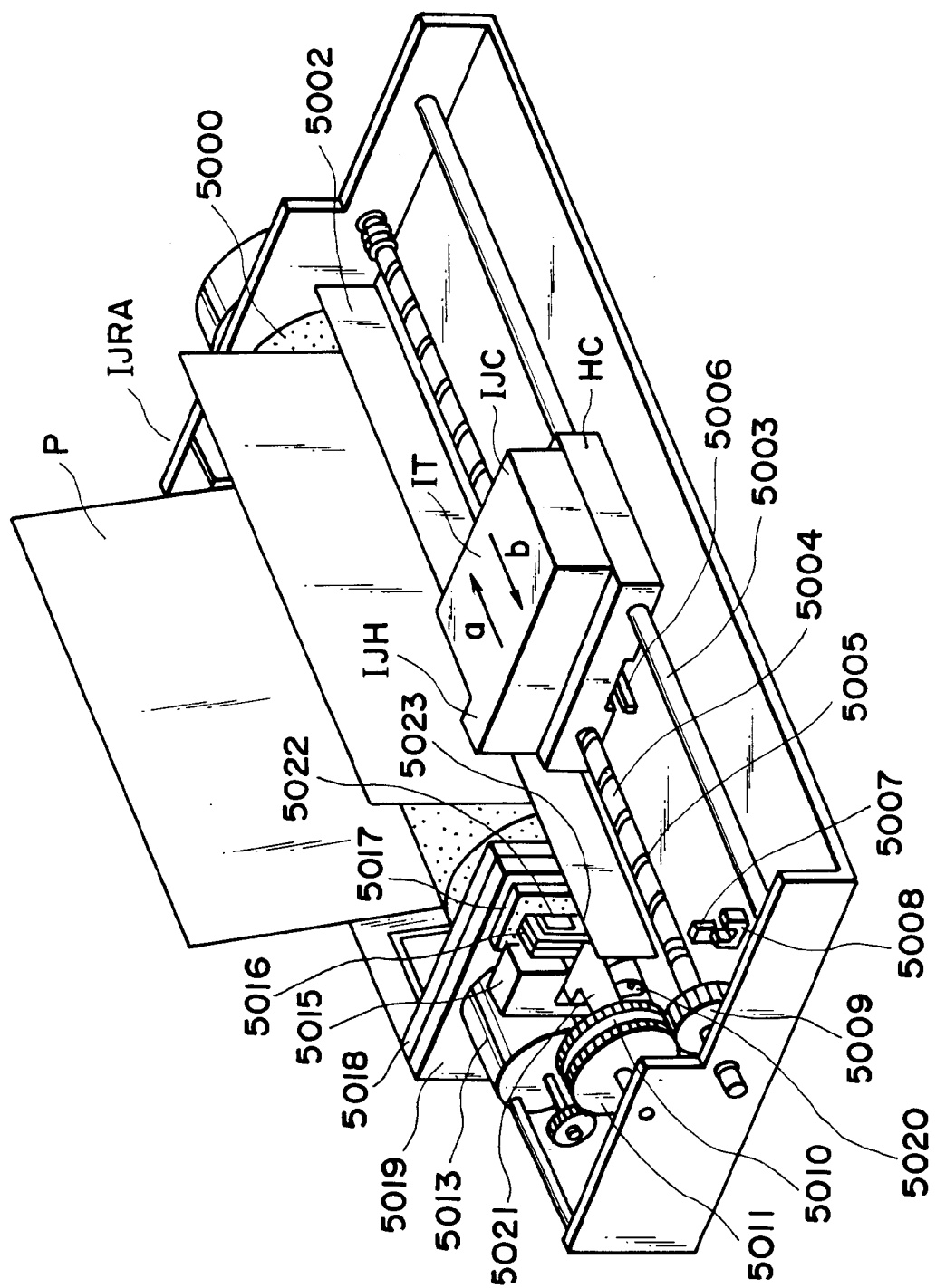
FIG. 20 is a perspective view showing the structure of an ink jet printer applicable to the present invention.
Figure 21:
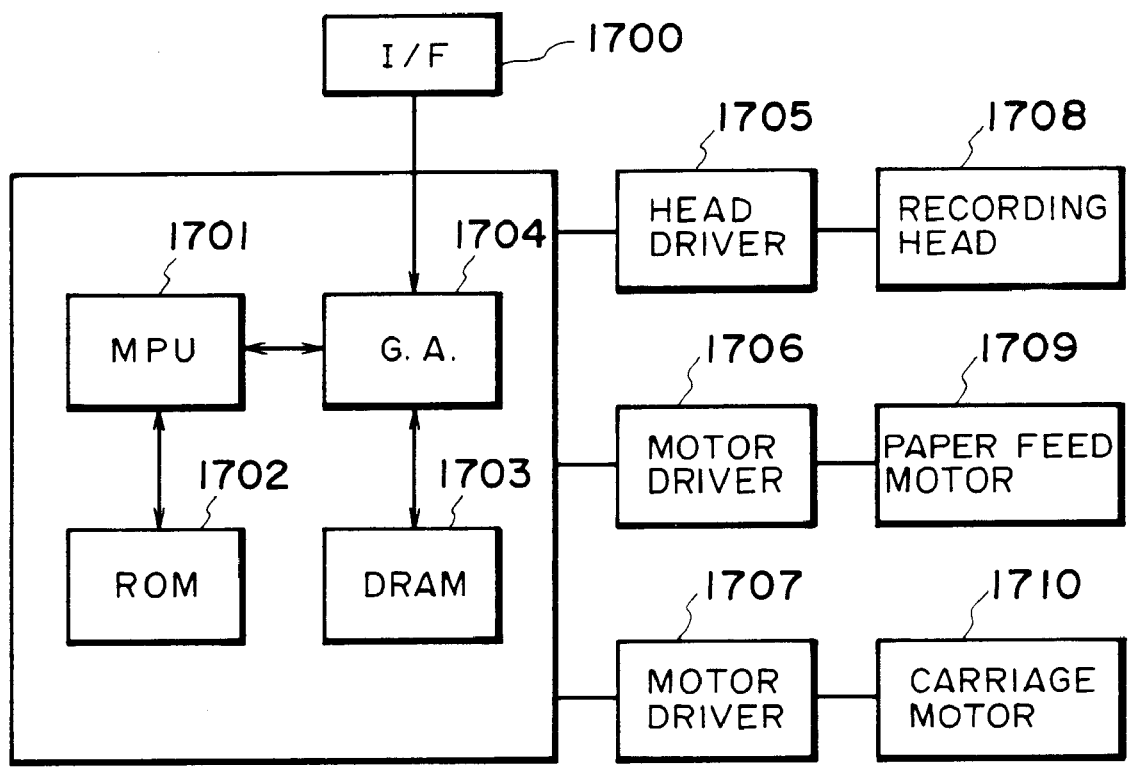
FIG. 21 is a block diagram showing the outline structure of the ink jet printer shown in FIG. 20.

FIG. 20 is a perspective view showing the structure of a printer applicable to the present invention, such as an ink jet printer.

In FIG. 20, a drive motor 5013 rotates in the normal and reverse directions. A lead screw 5005 is fitted in a spiral groove 5004 and rotated by the drive motor 5013 via drive transmission gears 5011 and 5009. A carriage HC coupling to the spiral groove 5004 has an unrepresented pin and is reciprocally moved in the arrow a and b directions. An ink jet cartridge IJC is mounted on the carriage HC. A paper pusher plate 5002 pushes a recording sheet against a platen 5000 over the carriage motion span. Photocouplers 5007 and 5008 detect a lever 5006 of the carriage when they enter the detection range of the photocouplers, and function as a home position detecting means for changing the rotation direction of the motor 5013. A member 5016 supports a cap member 5022 for capping the surface of a recording head. Suction means 5015 sucks the inside of the cap member to perform suction recovery of the recording head via an opening 5023 in the cap member. A cleaning blade 5017 is moved backward and forward by a member 5019. A main body support plate 5018 supports the blade 5017 and member 5019. A lever 5012 is used for starting the suction of the suction recovery, and moves with a cam 5020 engaged with the carriage under the control by a known transmission means such as clutches operated by the driving motor.

The capping, cleaning, and suction recovery operations are performed with the help of the lead screw 5005 when the carriage enters the home position area. These operations may be performed by using a different system so long as it allows such operations at known timings.

FIG. 21 is a functional block diagram of the printer shown in FIG. 20.

In FIG. 21, reference numeral 1700 represents an interface via which a record signal is inputted, reference numeral 1701 represents an MPU, reference numeral 1702 represents a program ROM for storing control programs to be executed by MPU 1701, and reference numeral 1703 represents a DRAM for storing various data such as the record signal and record data supplied to the head. Reference numeral 1704 represents a gate array for controlling the supply of the record data to a recording head 1708 and for the data transfer between the interface 1700, MPU 1701, and DRAM 1703. Reference numeral 1710 represents a carrier motor for transporting the recording head 1708, reference numeral 1705 represents a head driver for driving the recording head, reference numeral 1706 represents a motor driver for driving the transport motor 1709, and reference numeral 1707 represents a motor driver for driving the carrier motor 1710.

With the printer constructed as above, when a record signal is inputted from the host computer to the interface 1700, the record signal is converted into a print record data by the gate array 1704 and MPU 1701. Then, the motor drivers 1706 and 1707 are driven to actuate the recording head in accordance with the record data supplied from the head driver and to print the record data.

What is claimed is:

1. An output apparatus which communicates with an information processing apparatus through a bi-directional interface, said output apparatus comprising:
   a plurality of memory means;
   reception means for receiving a status request command for inquiring as to (1) a total capacity or as to (2) an available capacity of at least one of said plurality of memory means from the information processing apparatus through the bi-directional interface; and
   transmission means for transmitting status information indicating the selected total or available capacity of the at least one of said plurality of memory means to the information processing apparatus through the bi-directional interface in response to the status request command received by said reception means.

2. An output apparatus according to claim 1, wherein said output apparatus comprises a printer.

3. An output apparatus according to claim 1 or 2, wherein the information processing apparatus comprises a host computer.

4. An output method for use with an output apparatus which has a plurality of memory means and which communicates with an information processing apparatus through a bi-directional interface, said method comprising the steps of:

receiving a status request command for inquiring as to (1) a total capacity or as to (2) an available capacity of at least one of the plurality of memory means from the information processing apparatus through the bi-directional interface; and transmitting status information indicating the selected total or available capacity of the at least one of the plurality of memory means to the information processing apparatus through the bi-directional interface in response to the status request command received in said receiving step.

5. An output method according to claim 4, wherein the output apparatus comprises a printer.

6. An output method according to claim 4 or 5, wherein the information processing apparatus comprises a host computer.

7. A memory medium storing instructions for causing a programmable apparatus to perform an outputting method for use with an output apparatus which has a plurality of memory means and which communicates with an information processing apparatus through a bi-directional interface, said method comprising the steps of:

receiving a status request command for inquiring as to (1) a total capacity or as to (2) an available capacity of at least one of the plurality of memory means from the information processing apparatus through the bi-directional interface; and transmitting status information indicating the selected total or available capacity of the at least one of the plurality of memory means to the information processing apparatus through the bi-directional interface in response to the status request command received in said receiving step.

8. A memory medium according to claim 7, wherein the output apparatus comprises a printer.

9. A memory medium according to claim 7 or 8, wherein the information processing apparatus comprises a host computer.

10. A program product for causing a programmable apparatus to perform an outputting method for use with an output apparatus which has a plurality of memory means and which communicates with an information processing apparatus through a bi-directional interface, said program product comprising:

receiving code, for causing receiving of a status request command for inquiring as to (1) a total capacity or as to (2) an available capacity of at least one of the plurality of memory means from the information processing apparatus through the bi-directional interface; and transmitting code, for causing transmitting of status information indicating the selected total or available capacity of the at least one of the plurality of memory means to the information processing apparatus through the bi-directional interface in response to the status request command received in said receiving.

11. A program product according to claim 10, wherein the output apparatus comprises a printer.

12. A program product according to claim 10 or 11, wherein the information processing apparatus comprises a host computer.

13. An output apparatus which communicates with an information processing apparatus, said output apparatus comprising:

a plurality of memory means;

reception means for receiving a status request command for querying a capacity of at least one of said plurality of memory means from the information processing apparatus;

transmission means for transmitting status information indicating the capacity of the at least one of said plurality of memory means to the information processing apparatus in response to the status request command received by said reception means; and control means for, in response to an instruction designating one of said plurality of memory means, storing data received form the information processing apparatus in said one memory means designated by the instruction.

14. An output apparatus according to claim 13, wherein the status request command inquires a total capacity or an available capacity of at least one of said plurality of memory means.

15. An output apparatus according to claim 13, wherein said reception means receives data and a command designating one of said plurality of memory means from the information processing apparatus, and said control means stores the received data in said one memory means designated by the received command.

16. An output apparatus according to claim 15, wherein said plurality of memory means include non-volatile memory means and volatile memory means, and the command designates one of the non-volatile memory means and the volatile memory means.

17. A method of storing data in an output apparatus which has a plurality of memory means, said method comprising the steps of:

receiving a status request command for querying a capacity of at least one of the plurality of memory means from an information processing apparatus;

transmitting status information indicating the capacity of the at least one of the plurality of memory means to the information processing apparatus in response to the status request command received in said receiving step; and in response to an instruction designating one of the plurality of memory means, storing data received from the information processing apparatus in the one memory means designated by the instruction.

18. A program product for causing an output apparatus which has a plurality of memory means to store data in the plurality of memory means, said program product comprising:

receiving code, for causing receiving of a status request command for querying a capacity of at least one of the plurality of memory means from an information processing apparatus;

transmitting code, for causing transmitting of status information indicating the capacity of the at least one of the plurality of memory means to the information processing apparatus in response to the status request command received in said receiving code; and controlling code, for causing, in response to an instruction designating one of the plurality of memory means, storing of data received from the information processing apparatus in the one memory means designated by the instruction.

19. An information processing method comprising the steps of:

transferring, from an information processing apparatus to an output apparatus, a status request command for inquiring a capacity of at least one of a plurality of memory means provided in the output apparatus;

transferring, from the output apparatus to the information processing apparatus, status information indicating the capacity of the at least one of the plurality of memory means;

transferring, from the information processing apparatus to the output apparatus, an instruction designating one of the plurality of memory means; and storing data transferred from the information processing apparatus to the output apparatus in the one memory means designated by the transferred instruction.

20. A method according to claim 19, wherein the status request command inquires a total capacity or an available capacity of at least one of the plurality of memory means.

21. A method according to claim 19, further comprising the step of receiving data and a command designating one of the plurality of memory means from the information processing apparatus, wherein the received data is stored in the one memory means designated by the received command in said storing step.

22. A method according to claim 21, wherein the plurality of memory means include non-volatile memory means and volatile memory means, and the command designates one of the non-volatile memory means and the volatile memory means.

23. A method according to claim 19, further comprising the step of displaying the capacity of the at least one memory means in accordance with the transferred status information.

\* \* \* \* \*